United States Patent [19]

Anglade et al.

[11] Patent Number: 5,116,209

[45] Date of Patent: May 26, 1992

[54] DEVICE OF RETRACTABLE STOPS FOR ROTOR BLADES OF GIROPLANES, AND ROTOR HEAD INCLUDING SUCH A DEVICE

[75] Inventors: Marc Anglade, Carnoux; Bruno Guimbal, Chateauneuf-Les-Martigues; Michel A. Hancart, Bouc-Bel-Air, all of France

[73] Assignee: Societe Nationale Industrielle et Aerospatiale, Paris, France

[21] Appl. No.: 533,642

[22] Filed: Jun. 5, 1990

[30] Foreign Application Priority Data

Jun. 8, 1989 [FR] France .............................. 89 07618

[51] Int. Cl.⁵ ............................................. B64C 27/51
[52] U.S. Cl. ............................ 416/107; 416/134 A; 416/140; 416/164; 416/106
[58] Field of Search ............ 416/103, 104, 107, 134 A, 416/135, 139, 140 A, 141, 147, 148, 149, 164, 167

[56] References Cited

U.S. PATENT DOCUMENTS 4,235,570  11/1980  Ferris et al. .................... 416/134 A
4,516,909  5/1985  Caramaschi et al. ........... 416/134 A
4,551,067  11/1985  Caramaschi et al. ............. 416/106
4,652,210  3/1987  Leman et al. .................... 416/134 A
4,732,540  3/1988  Mouille et al. .................. 416/134 A

FOREIGN PATENT DOCUMENTS

2041310A  9/1980  United Kingdom .
2139171A  11/1984  United Kingdom .

Primary Examiner—Edward K. Look
Assistant Examiner—James A. Larson
Attorney, Agent, or Firm—Armstrong, Nikaido, Marmelstein, Kubovcik & Murray

[57] ABSTRACT

A device of retractable stops for the blades of articulated rotors for giroplanes, which includes a stationary stop 20 with a finger 22 radially converging towards the exterior and externally radially protruding on the external spar 9 of the articulation means 7 of each blade on the hub 3, as well as a movable stop 21 with a receptacle 36 resiliently returned by a return device 45 in a position fit around the finger, but disengaged from the finger by centrifugal force when the rotation speed of the blades is higher than a set value. The invention therefore provides absolute stops in flapping and drag in the "ground" position and sharp stops in the flight position. One advantageous application is for helicopter rotors.

28 Claims, 6 Drawing Sheets

DEVICE OF RETRACTABLE STOPS FOR ROTOR BLADES OF GIROPLANES, AND ROTOR HEAD INCLUDING SUCH A DEVICE

The present invention relates to devices of retractable stops for rotor blades of gyroplanes and deals more particularly with a device of mixed stops, in flapping and drag, for the blades of main rotors (or lifting rotors) or tail rotors (or anti-torque rotors) for helicopters, on which each rotor blade is connected to the corresponding rotor hub by retaining and linking (or articulation) means comprising at least one laminated spherical stop.

The invention has therefore more particularly for an object a device of flapping and/or drag stops, which are retractable, intended to be provided on an helicopter rotor head of the type including a rotor hub which, on the one hand, is unitary with a rotor mast to be driven in rotation around it axis, which is identical to the rotation axis of the rotor and to which, on the other hand, each of the rotor blades is connected in particular by retaining and linking means for this blade on the hub, said means including at least two spars, one of which, in external radial position relatively to the other, is rigidly secured on the hub, whereas the other spar, in internal radial position, is solid in motion with the root of the blade, by means of a forked fastening element.

The forked fastening element may be an extension of the root of the blade, radially and inwardly, i.e. towards the hub, or also a substantially radial linking element, having the shape of a double yoke or fork, or the shape of a sleeve having a radial yoke or fork at each of its two radial extremity portions. Thus, the external radial extremity yoke of the double yoke or of the linking sleeve may receive and retain the root of the blade, whereas the internal radial extremity yoke of this double yoke or of this sleeve may be linked to the internal radial spar of the retaining and linking means.

It is well known that the main rotors and the tail rotors of helicopters of the articulated type must be provided with flapping stop devices for the blades of these rotors, in order to prevent too great angular clearances in flapping of these blades on each side of their rotation plane, at stop or at slow rotation speeds of the rotor, this so as to prevent any damage of the blades and/or other parts of the helicopter that could be hit by the blades. For example, for the main rotors, it is necessary to limit the flexing in the downward direction of the blades of these rotors, under the effect of their own weight, at low rotation speeds of the rotors and at the stopping of the rotors, in order to avoid that said blades hit the fuselage or even the ground, and it is also necessary to limit their angular flapping clearance in the upward direction, under the influence of a wind blast, so as to avoid any fierce or savage fall-back of the blade which could damage it or damage the helicopter or the low stop provided for limiting the flexing in the downward direction.

There has already been suggested a great number of various devices of "low stops" as well as of "high stop", such devices including for each rotor blade, a stop disposed on the root of the blade, or on a linking element between the blade and the hub, and a stop mounted on the hub or on the rotor mast, which could possibly be a stop for all the blades, realized as a ring of the "reciprocal" type. Most of the known embodiments of these flapping stop devices are of the type including, for each blade, at least a stop retractable during flight under the influence of the centrifugal force. In this case, this retractable stop has a support or rest surface and is swingably mounted either on the hub or on the blade root, or on a linking element between the blade and the hub, the swinging or pivot axis being either parallel or perpendicular to the rotation axis of the hub. The retractable stop carries an inertia block or fly-weight at the extremity of an arm and is solicited back by a spring in cooperation position with the other stop of the device associated to the involved blade. The other stop is either a support heel or shoulder residly secured respectively on the blade root, or on said linking element between the blade and the hub, or on the hub, or even being itself retractable under the influence of the centrifugal force, so that, if the rotation speed of the rotor is above a predetermined set value, the centrifugal force acting upon the inertia block will effectively rotate the stop contrary to the force exerted by the return spring, so that its support surface cannot reach contact with the other stop. If the rotation speed of the rotor is lower than said set value, the spring returns the stop in a position allowing the contact of its support surface with the other stop, thereby limiting the flappings of the corresponding blade, in the upward and/or in the downward direction relatively to its rotation plane, depending on the nature of the flapping stop device, i.e. if it is a device with "low" or "high" stops.

As concerns the tail rotors of helicopters, their devices of flapping stops limit the angular flapping movements of the blades on each side of their rotation plane and include, most generally, for each rotor blade, two support heels or shoulders which are rigidly secured to the root of the blade, respectively in internal axial position and in external position relatively to the blade root, all the internal heels taking support against a single annular shoe which is rigidly secured in internal axial position around the hub or the mast of the tail rotor, in order to limit the flappings of the blades axially towards the exterior relatively to their rotation plane.

These various embodiments of the devices of flapping stops are adapted to the mounting on articulated rotors having various types of hubs to which the blades are each connected by retaining and linking means comprising at least a laminated spherical stop as well as by a forked fastening element of the blade on the hub.

These different types of hubs include:

the hubs with a single radial plate supported by the rotor mast and pierced by cavities, the number of each is equal to the number of blades and in each of which are located at least partially the retaining and linking means of a corresponding blade on the hub plate, as disclosed in French Patent 2 427 251 of Aerospatiale;

the hubs with two radial plates which are superposed and supported by the rotor mast, the two plates being spaced one from the other in the direction of the rotor axis for lodging at least partially between them the retaining and linking means of each blade on the two plates of the hub, as disclosed in French Patent 2 456 034 of Aerospatial; and the hubs with an integrated tubular hub-mast, wherein the rotor mast and the hub are constituted by a single tubular part pierced, from each rotor blade, by one or two openings for the passage of one of the arms or of the two arms of the forked fastening element of the blade on the hub, the fastening and linking element of each blade to the hub being at least partially lodged inside an extremity portion of the integrated tubular hub-mast, as disclosed in French Patent n° 2 584 995 and 2 584 996 of Aerospatiale.

For equipping rotors including these different types of hubs, and more particularly when the hub is realized as a integrated tubular hub-mast, it has also been suggested, in French Patent 2 584 997 of Aerospatiale, a device of flapping stops including, for each blade, at least one stop element, which is solid in motion with the blade root and which cooperates with at least one stop element solid with the hub and/or the mast, so as to limit the flapping of the blade at least on one side of the blade rotation plane. Each stop element is solid in motion with the root of a blade being carried by the internal radial spar of the retaining and linking means of this blade on the hub, this stop element further projecting substantially radially towards the inside relatively to this internal radial spar. The stop element presented by this spar has the shape of a beak constituting one part with said spar and axially limiting on one side a gliding bearing surface having the shape of a convex portion of a sphere on the internal radial side of this internal radial spar and the beak having, projecting towards the outside of the convex gliding bearing surface, a stop surface directed substantially towards the intersection of the rotor rotation axis and the blade rotation axis. A corresponding stop element is included, which is solid with the hub and/or the mast, having a support surface substantially opposite the stop surface of the beak and limiting axially on one side a concave gliding bearing surface, which has a curvature corresponding to the curvature of the convex gliding bearing surface, so that the two bearing surfaces may glide one upon the other during the flappings of the corresponding blade, until the stop surface of the beak reaches the opposite support surface which limits the concave gliding bearing surface, so as to limit the extreme flappings authorized for the blade at least on one side of the blade rotation plane.

In a preferred embodiment of this French patent, the convex gliding bearing surface is formed on the bottom of a recess or cavity machined in the internal radial side of the corresponding internal radial spar and axially limited between two beaks, and the concave gliding bearing surface, which cooperates with the convex gliding bearing surface, is limited between two support surfaces, so that each of the two beaks reaches contact, by its stop surface against one of the two supports surfaces, after gliding of the two bearing surfaces one upon the other, at the occasion of the extreme flappings authorized for the blade on a corresponding side of the rotation plane of the blades. Further, the concave gliding bearing surfaces of all the rotor blades may be provided by the external lateral surface of a single central flapping stop, which is coaxial to the mast and to the hub. This single central flapping stop is an element which has the shape of an axial surface of revolution with a concave external lateral surface limited between two frusto-conical or tapered surfaces each converging axially on the opposite side relatively to the center of the central flapping stop. Each surface forms one of the support surfaces cooperating with the stop surfaces of all the beaks which are located axially of a same corresponding side of the center of the central flapping stop, which is at least partially located inside the integrated tubular hub-mast.

In all of the embodiments of flapping stops, for main or tail rotors, which have been mentioned hereinabove, except the one disclosed in French Patent 2 584 997, it is necessary to add, on the one hand, on the hub and/or on the mast and, on the other side, on the blade root or on a linking element between the blade root and the hub, a relatively great number of parts, thereby increasing the weight, the bulk, the complexity and therefore the costs, as much for the construction as for the maintenance of the rotor head.

The device of flapping stops disclosed in French Patent 2 584 997 does not have these drawbacks, but, on the other hand, constitutes only a downright stop, during flight, with a rotating rotor, and occupies a substantial volume inside the integrated tubular hub-mast. Therefore, protecting a portion of the flight control system by locating it inside the integrated tubular hub-mast, is not possible, since the volume occupied therein by the flapping stop devices may prevent such an arrangement.

In general, a device of flapping stops according to French Patent 2 584 997 is bulky and cumbersome if one desires to dispose the means for controlling the pitch of the blades very near from the internal radial extremity of the linking element of each blade on the hub.

One object of the present invention is to provide a stop device for the angular flapping oscillations and/or the drag oscillations which has a reduced weight, a limited bulk, a great simplicity of structure and which is therefore economical as concerns mounting and maintenance of the rotor, when the rotor is equipped with a hub according to one of the various types which has been mentioned hereinabove.

Another object of the invention is to provide a device of absolute flapping stops, on one side and / or the other side of the rotation plane of the blades, when the rotor is at stop or rotates at a speed lower than a predetermined set value, the device further including downright stops in flight, or when the rotor rotates at a speed higher than said predetermined set value, said device being characterized by the fact that the stop device limits the amplitude of the angular variations in flapping and/or in drag of the corresponding blade.

Another object still of the invention is to provide a device of mixed stops, i.e. flapping and drag stops, which provides as well absolute stops in drag, forwardly and/or rearwardly directed, when the rotation speed of the rotor is lower than said predetermined set value, these stops also act as downright stops for the drag when the rotation speed of the rotor is higher than said predetermined set value.

Another object of the invention is to provide a device of flapping and drag mixed stops which allows, when the rotor does not rotate or when the rotation speed thereof is lower than a determined set value, to freely control the pitch of the blades along the whole angular range which is usable in flight.

A further other object of the invention is to provide a mixed flapping and drag stops device which is compatible with means for controlling the pitch of the blades, located inside an integrated tubular hub-mast.

For this purpose, the invention provides a device of stops for the blades of an articulated rotor of a giroplane, including a rotor hub solid in rotation with a rotor mast around a rotation axis of the rotor and to which each of the blades is connected by retaining and linking means, which include at least two spars, one of which, in external radial position relatively to the other, is rigidly secured to the hub, whereas the other spar, in internal radial position, is solid in motion with the corresponding blade root through a forked fastening element of the blade to the hub, the forked fastening element is an element of the retaining and linking means, and has at least two arms which are connected to a corresponding blade and to the rotor hub, device of flapping and drag stops including, for each blade, two stops, the first of which is stationary relatively to the hub and carries a stop element, which is radially protruding towards the exterior relatively to said external radial spar and has at least a support zone define by at least one portion of a surface of revolution around a longitudinal axis of said stop element which is substantially radial and identical with the axis of the corresponding blade pitch, and said stationary stop cooperates with the second stop which is movably disposed on the unit formed by said blade and said linking element, and including a stop element having at least one support surface defined by at least one portion of one surface of revolution around the longitudinal axis of said stop element of said stationary stop. When the movable stop is in cooperation position with the stationary stop, said movable stop being retractable under the influence of centrifugal force against resilient return means, which, when the rotation speed of the rotor is inferior to a set value, solicits the movable stop towards the stationary stop, in a cooperation position wherein at least one support surface of the stop element of the movable stop is located directly opposite and in closed proximity of at least one support zone of said stop element of said stationary stop, so as to limit to low values or to zero the angular movements of the blade in flapping, at least one side of the rotation plane of the blades, as well as in drag on each side of the longitudinal axis of the blade, due to contact between at least one support surface of the movable stop against at least one support zone of the stationary stop, whereas the movable stop is retracted relative to the stationary stop when said rotation speed is higher than said set value, so as to allow angular movements of said blade in flapping at least one side of the rotation plane of the blades, and in drag, on each side of the longitudinal axis of the blade. The stop element of the stationary stop has shape of a finger radially converging towards the exterior. The movable stop is mounted on said unit blade-linking element by a link with swinging around a pivot axis substantially parallel to the rotation axis of the rotor and laterally displaced relatively to the pitch axis of the corresponding blade, and said stop element of the movable stop being conformed as a receptacle, the internal surface of which determines a support surface and which is solicited, by substantially radial pivoting towards the interior, by said resilient return means, in engagement position around the convergent finger. At rotation speeds lower than said set value, each support surface of the receptacle is substantially in contact with a corresponding support zone on the periphery of the convergent finger, so as to form an absolute stop in flapping on one and/or other side of the rotation plane of the blades and in drag in the backward and/or forward direction relative to the rotation direction of the rotor, and that, for a rotation speed higher than said set value and progressively increasing, said receptacle is radially pivoted or swiveled towards the exterior against the return means and progressively disengaged from the convergent finger, so as to determine, between each support surface of the receptacle and a corresponding support zone of the convergent finger, a clearance progressively increasing which allows progressively increasing angular variations of the corresponding blade in flapping and in drag, so as to form a downright stop in flight, for the flapping and drag movements of the blade.

Such a device of stops, which is simple, light, reliable, very precise and giving excellent results has therefore two functions:

when the rotation speed of the rotor is inferior or equal to the set value, which is lower than the minimum rotation speed of the rotor allowing the flight of the helicopter, the stop device is brought, by the resilient return means, in a position called "ground", in which it stops the unit blade-forked linking element, thereby limiting these flapping and drag movements to low or null values. This provides two significant advantages:

the first is to allow to dispense with the placing, on the extremities of the blades, in particular of the helicopters tail rotors, of bonnets connected by cables to the fuselage, or other tools, for avoiding the angular oscillations of the blades during the parking of the helicopter in presence of wind and, the second is to protect the joints or hinges of the blades on the hub against the effects of the permanent flapping of the non rotating blades.

When the rotation speed of the rotor is higher than said set value, the stop device is brought, by the effect of centrifugal force, in a position called "flight", wherein it limits the flapping and drag angle of the blades, realizing a downright stop, which is necessary for ensuring that, even during exceptional maneuvers, the blades will not penetrate the structure of the helicopter and that movable parts of the hub will not have contact one with the other.

An additional advantage is that in the "ground" position the stop device allows the free motion of the blades in pitch, so as to allow the verification of the correct operation of the control device for the pitch before flight and along the whole range of usable pitches, by the fact that each support zone on the periphery of the convergent finger is defined by at least one portion of a surface of revolution around a longitudinal axis of said finger which is substantially radial and identical with the axis of change of pitch of the corresponding blade.

Verification of proper functioning of the control device of the blade pitch is provided without introducing functional clearance in the stop device, because, further, each support surface of the receptacle of the movable stop is also defined by at least a portion of a surface of revolution around the longitudinal axis of the convergent finger of the stationary stop, when the movable stop is in cooperating position with the stationary stop.

In a advantageously simple embodiment, at least one portion of the peripherical surface of the convergent finger is a substantially frustro-conical or tapered surface forming a continuous support zone, and the receptacle presents an internal surface having also a substantially frusto-conical or tapered shape, opposite and substantially in contact with the substantially frusto-conical surface of the convergent finger in position of engagement of the receptacle around said convergent finger.

In order for the invention to ensure the two functions, i.e. "ground" and "flight", with the same parts, and allow the control of the free teetering of the pitch control before the starting in rotation of the rotor, to be substantially free of blocking and in order that the effects of a wrong operation be minimized, it is further advantageous that the apex angle of the frustro-conical support of the receptacle be smaller than the apex angle of the frustro-conical zone of support for the convergent finger.

In all cases, it is advantageous that the receptacle includes an annular portion, the internal side of which forms a single continuous support surface of the movable stop. In a first modification, the receptacle includes a bottom closing the annular portion on the side of its external radial extremity relatively to the axis of rotation of the rotor, and limiting the engagement of the receptacle around the convergent finger by contact with the external radial extremity of the convergent finger. But it is also possible for the receptacle to be a ring opened at its two radial extremities relatively to the rotation axis of the rotor and jointed around the convergent finger.

In these different cases, the receptacle, as the ring of the movable stop, has a determined weight so as to constitute simultaneously an inertia block or fly-weight, radially retractable to the exterior, against the resilient return means, as soon as the rotation speed of the rotor is superior to the set value.

In a simple and practical way, the pivot or swivel axis of the movable stop is mounted in a yoke or fork of a support part secured to the unit blade-fastening element, this support part being preferably inlaid, in a removable manner, in the forked fastening element of the blade on the hub.

According to a simple embodiment of the movable stop, the receptacle thereof is supported by an arm laterally protruding towards the exterior on a sleeve which is mounted rotating around the pivot axis. In this case, it is advantageous to reduce to bulk of the resilient return means and to simplify their mounting, that this means includes at least one torsion spring surrounding the sleeve of the movable stop and resting, on the one hand, against a first stationary stop of the unit blade-fastening element, and, on the other hand, on the arm of the movable stop, for pivoting the corresponding receptacle towards the convergent finger of the stationary stop of the device of flapping stops.

In order to avoid jamming of the stop element which has the shape of a receptacle, of the movable stop on the stop element, having the shape of a radial finger of the stationary stop, it is advantageous that the movable stop further includes a pin, which is applied, due to the effect of the resilient return means, against a second stationary stop of the unit blade-fastening element, when the rotation speed of the rotor is lower than said set value in order to limit the radial swiveling towards the interior of the movable stop so as to leave a small clearance between the support surface of the movable stop and the support zone of the stationary stop, in position of cooperation of the two stops.

When the articulation or linking of the movable stop on the unit blade-fastening element is supported by the above mentioned support element as presenting a yoke for mounting the pivot axis of said articulation, it is further advantageous that the second stationary stop of the unit blade-fastening element be formed by a stop surface limited b a rib of this support part. Similarly, the first stationary stop of the unit blade-fastening element is also an advantageously presented by this support part so that the mounting of this last part, when it carries the movable stop, on the forked fastening element of the blade on the hub be the only necessary intervention for equipping the unit blade-fastening element with its movable stop.

According to this simple, light, compact and well performing exemplary embodiment, the sleeve of the movable stop includes a central portion supporting the corresponding arm, and two cylindrical end portions, each of which is surrounded by one respectively, of the two helicoidal portions of a torsion spring, on which the extremity of each helicoidal portion situated on the side of the other helicoidal portion has the shape of a support tongue against the arm of the movable stop, whereas the opposed ends of the two helicoidal portions of the spring are connected one to the other and form an arch resting on the first stationary stop of the unit blade-fastening element.

In order to displace the contact and hammering (knocking) zone during the life time of the stationary stop, the convergent finger thereof is preferably mounted on a support axis, which is central and radial relatively to the rotation axis of the rotor, this support axis being solid with the hub and the convergent finger being able to take, around this support axis, several working positions and to blocked in each of these positions.

In order to facilitate the mounting of the stationary stop, its central support axis is secured to the external radial spar of the retaining and linking means of the corresponding blade on the hub, and coaxially to the pitch axis of the corresponding blade, and the positioning and the blocking of the convergent finger around the support axis is provided by a indexing device of rotation around the pitch axis of the corresponding blade.

According to a simple and practical exemplary embodiment, the support axis is threaded at its external radial extremity and constitutes a single point, through its internal radial extremity, with a coaxial cylindrical bearing, radially projecting to the exterior from a fastening element of the external radial spar on the hub, so that the convergent finger of the stationary stop is inserted and retained on the support axis by resting of a internal shoulder of said convergent finger against a connecting shoulder between the support axis and the cylindrical bearing surface, and by a nut screwed on the threaded extremity of the support axis, this indexing device including a transversal pin retain in the cylindrical bearing surface and at least one extremity thereof is protruding relatively to the lateral surface of this cylindrical bearing surface and is engaged in one of several slits provided in a portion of the convergent finger which surround the cylindrical bearing surface, in order to block this finger in the corresponding position in rotation around the support axis.

Additionally, for extending the life time of the stationary stop, its convergent finger advantageously includes a core realized in a rigid material and surrounded by an elastomeric sheath protecting against the hammering by the movable stop.

The invention has also for an object an articulated rotor head for a giroplane, of the type including a rotor hub solid in rotation with a rotor-mast around a rotation axis of the rotor, and to which each of the rotor blades is connected by a forked fastening element with two arms and by retaining and linking means on the hub which include an external radial spar, secured to the hub, and an internal radial spar, secured to the internal radial extremities of the two arms of the corresponding forked fastening element, the rotor head according to the invention being characterized by the fact that it includes, for each blade, a device of flapping and drag stops made according to the invention as defined hereinabove, and the retaining and linking means including a laminated integrated spherical stop between the two corresponding spars and located between the two arms of the corresponding forked fastening element, so that its rotation center is substantially situated on the side of the external radial spar. In fact, the device of flapping and drag stops according to the invention allows to realize precise and well operating stops for the rotors on which the axes of flapping and drag of the blades are not materialized, as it is the case for rotors articulated by means of spherical laminated stops.

In order to ensure that in a weak volume a good link between each forked fastening element and the corresponding internal radial spar, this last has, in its opposed axial sides, housing recesses for the internal radial extremities of the arms of the forked fastening element to which the internal radial spar is directly attached by a single pin having the axis thereof substantially parallel to the rotor axis of the rotor.

As the device of flapping and drag stops is located radially at the exterior of the external radial spar of the retaining and linking means of each blade on the hub, the rotor head includes advantageously, according to the invention, for each blade, a lever of pitch control which is solid with the corresponding internal radial spar and protrudes laterally relatively to this last, said pitch control lever having a radial yoke wherein is hinged an extremity of the rod for controlling the pitch, the other extremity of which is hinged to a pitch control device.

For equipping a tail rotor of helicopter, the rotor head according to the invention may be such that the forked fastening element of each blade is integrated at the root of the corresponding blade. But, for equipping a main rotor of helicopter, the rotor head may be such that the forked fastening element of each blade is substantially radial linking element, as a sleeve, having at its internal radial extremity the shape of a yoke with two arms secured to the internal radial spar of the corresponding retaining and linking means, and having at its external radial extremity the shape of a yoke for securing the root of the corresponding blade by two axes substantially parallel to the rotation axis of the rotor one of which is possibly removable, in order to allow the blade to be folded back by pivoting around the other axis.

On the rotor head according to the invention, the hub may include two radial plates which are superposed and axially spaced one from the other; between the edges of said plates the external radial spar of the retaining and linking means of each blade is mounted as spacer or crossbar and crosses recesses provided in the two arms of the corresponding forked fastening element.

But it is also possible that the rotor head according to the invention be such that the hub includes a single radial plate, bored, for each blade, of a recess wherein are at least partially located the corresponding retaining and linking means, the external radial spar of which is retained against the external edge of the recess and on the corresponding peripheral portion of the plate.

Finally, the rotor head according to the invention may be advantageously implemented such that the hub and the rotor mast are realized as an integrated tubular hub-mast pierced, for each blade, by at least one opening crossed by one of the arms of the corresponding forked fastening element, and in the interior of which are at least partially located the corresponding retaining and leaking means, fixed in support, by their external radial spar, against a portion of the internal side of the integrated tubular hub-mast.

In this last case, the rotor head according to the invention is particularly adapted for equipping a tail rotor of helicopter, the integrated tubular hub-mast having then preferably a substantially frustro-conical shape and being intended to be solidarized in rotation, on the side of its small base, to the output shaft of the auxiliary transmission the integrated tubular hub-mast surrounding a control device of the general pitch of the blades of the tail rotor including a collective sleeve, which is disposed inside the tubular hub-mast for axial sliding, and the axial extremity portion of which directed towards the great base of the hub-mast carries, for each blade, a radial yoke wherein is hinged an extremity of a corresponding pitch control rod.

At last, for ensuring a good securing and a good location of the retaining and linking means of the blades on the hub, in a rotor head the hub of which has only one single radial plate or is realized as an integrated tubular hub mast, it is advantageous that, for each blade, the corresponding external radial spar be conformed, radially towards the exterior, as a stirrup which rides a corresponding portion of the hub, on which this internal spar is secured b means of a fastening part having the shape of a stirrup radially directed towards the interior, also riding the corresponding portion of the hub and carrying the stationary stop of the device of flapping stops.

The invention will be better understood, and other advantages and features of the invention will appear when considering the following detailed description, given without any limitation, of various embodiment of the invention, which are represented in the appended drawings, in which.

Figure 1:
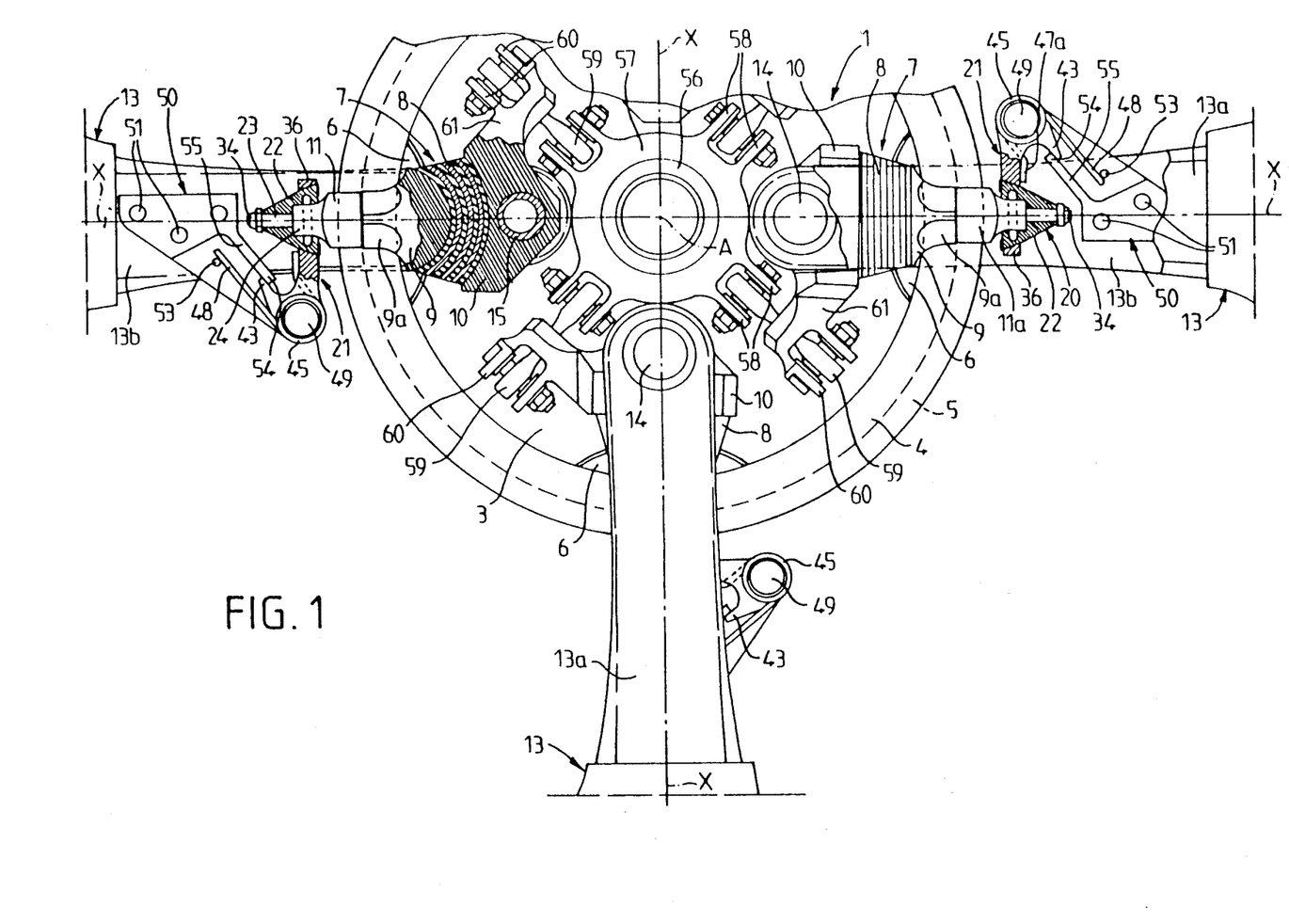
FIG. 1 represents partially the head of a hinged four-bladed tail rotor, for an helicopter, partly in side elevation and partly in cross-section through the rotation plane of the blades and with partial deletion.
Figures 2, 3:
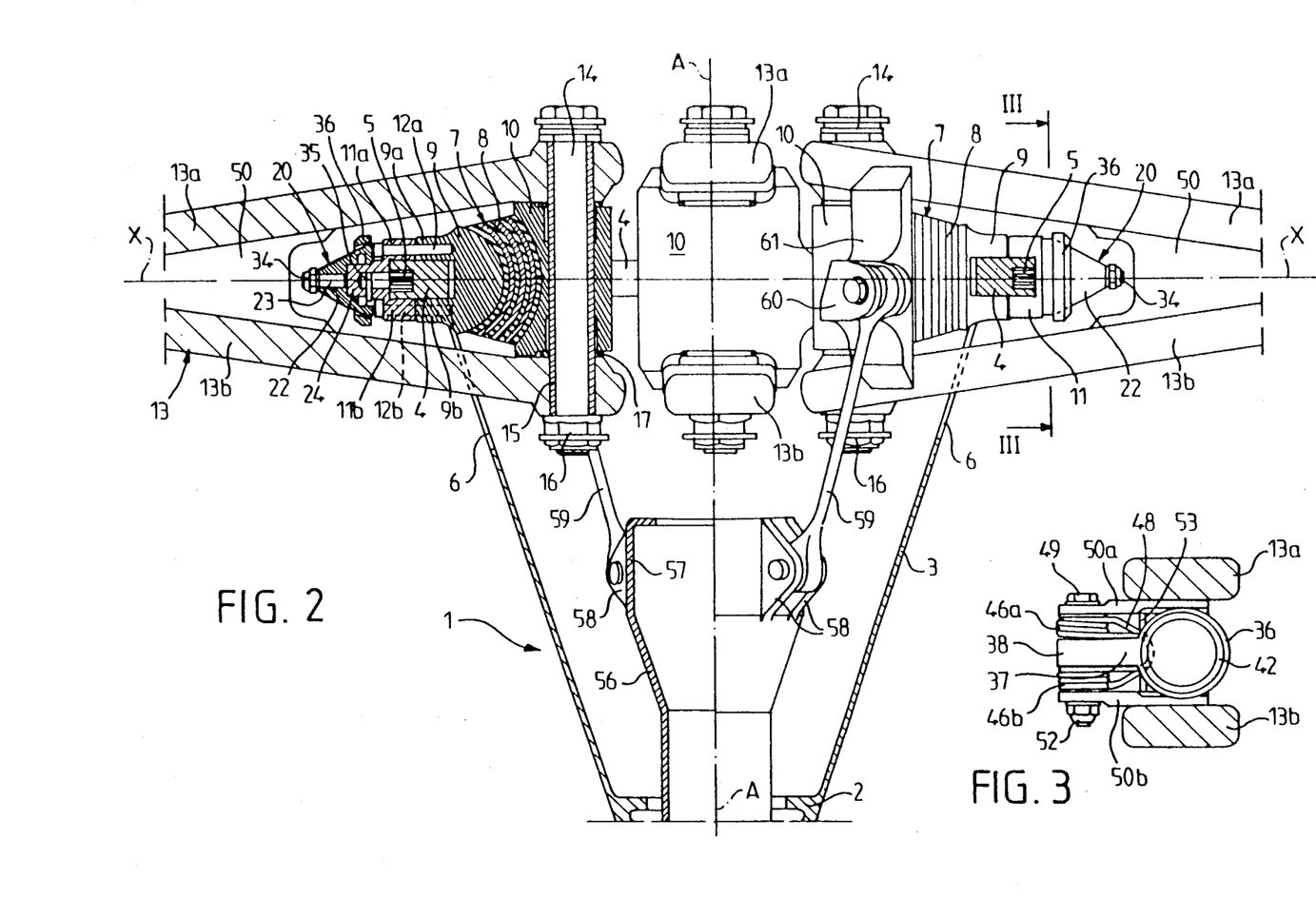
FIG. 2 represents the rotor head of FIG. 1, partially in cross-section by a diametral plane passing through the rotation axis of the rotor and partly in plane, along a direction perpendicular to said axis.
FIG. 3 is a schematic cross-section along III—III of FIG. 2.

With reference to FIGS. 1 and 2, the head of the articulated four-bladed tail rotor includes an integrated tubular hub-mast 1, essentially constituted by a one-piece tubular body having a substantially frustro-conical external general shape, which is of revolution around an axis A, which is the rotation axis of the rotor and the portion of which situated on the side of the small base, or internal axial portion (relatively to the longitudinal symmetry plane of the helicopter not shown but perpendicular to the axis A on the bottom of FIG. 2), constitutes a tubular mast 2, solid in rotation around axis A of the output shaft of the auxiliary transmission, mounted at the tail of the helicopter in order to provide the driving of the hub-mast 1 and therefore of the tail rotor, in rotation around axis A. The portion of the hub-mast 1 located towards its great base, or external axial portion, constitutes a body of tubular hub 3. Mast 2 is connected to the hub body 3 and is extended therefore directly by said hub body 3 which diverges progressively starting from mast 2 up to its free external axial extremity (corresponding to the great base of the frusto-conical body), having locally and peripherically an extra-thickness forming a circular ring or reinforcing rim 4, with a rectangular transversal section and protruding radially towards the exterior of hub body 3. Rim 4 surrounds therefore the circular opening of the free external extremity of hub body 3. The monobloc tubular body 1, constituted by mast 2 and hub body 3 with its rim 4, may be realized in composite materials or be metallic, e.g. in steel or titanium, and in this latter case realized starting from a stamped or forged roughpiece. Further rim 4 has a peripheral groove, with a rectangular or square section, which opens on its external radial side, and a girdle or band 5 in composite materials is located in said groove. This girdle 5 is formed for example by spooling, in groove of rim 4, directional stratiwires in carbon or aramide fibers, pre-impregnated with an epoxy resin, then by polymerization of the resin which is hardened. This girdle 5 provides for the necessary redundance, in case of fracture of the hub body 3, following a crack or a balistic impact, for taking into account of centrifugal stresses. Radial openings 6, identical and in number equal to the number of the rotor blades, i.e. four openings 6 in this example, are machined in the portion of the hub body 3 which is directly adjacent rim 4 and are regularly located in the circumferential direction on the periphery of this portion.

Figure 11:
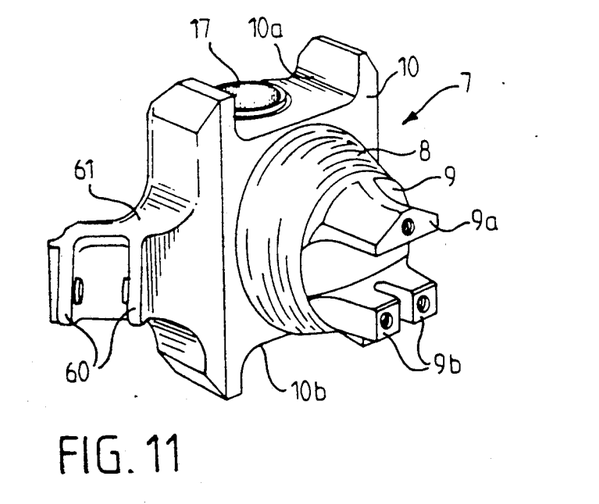
FIG. 11 is a perspective view of a spherical laminated stop, with its internal and external radial spars, and constituting the retaining and linking means of each of the four blades on the hub of the rotor head of FIGS. 1 and 2.

Each of the four rotor blades is connected to the portion constituting the hub body 3 by retaining and articulation means constituted, in this example, by a laminated spherical stop 7 essentially located in the hub body 3 inside rim 4, and represented, separately and in perspective, in FIG. 11. This laminated spherical stop 7 allows the articulation of the corresponding blade on the hub 3 around its three axis of flapping, of drag and of pitch change, which intersect at the point of swivel determined by the center of rotation of the corresponding laminated spherical stop. This part is a component comprising essentially a laminated central portion 8, constituted by a pile of layers in the shape of spherical portions of a sphere and alternatively rigid, e.g. metallic, and resilient, e.g. in synthetic rubber, as silicone elastomer, this laminated central portion 8 being cured or vulcanized between two rigid spars 9 and 10, e.g. metallic.

Each spherical laminated stop 7 is applied against the internal radial side of rim 4, at the level of the portion thereof situated directly over an opening 6, and the laminated spherical stop 7 is secured against rim 4 by its external radial spar 9 conformed, in its external radial portion, as a stirrup, radially open towards the exterior so as to partially ride rim 4. As shown in FIG. 11, this stirrup shaped external radial portion of the external radial spar 9 includes a high arm 9a separated of two low arms 9b, which are parallely disposed, by a sufficient space for receiving a portion of rim 4. By its internal radial portion, which has a convex shape, the external spar 9 is solid with the concave external side of the laminated central portion 8 of this stop 7 whereas this laminated central portion 8 is solid, by its convex internal face, of the concave external radial portion of internal radial spar 10. Each laminated spherical stop 7 is located inside the opening of the external axial extremity of hub body 3 limited by rim 4, so that its center of rotation is situated in the middle plane of rim 4 and preferably inside the reinforcing band or girdle 5 of said rim 4.

Each spherical laminated stop 7 is held in position on rim 4 of hub body 3 by means of an attachment element 11, which is also rigid, an internal radial portion thereof having also the shape of a stirrup, but radially open towards the exterior, in order to be also able to partially ride rim 4. This attachment element 11 having the shape of a stirrup has also an external axial arm 11a and then internal axial arm 11b which are disposed in parallel relationship and are separated one from the other by a distance corresponding to the axial thickness of rim 4 and they are located, respectively facing the external axial arm 9a and the two internal axial arms 9b of the stirrup portion of spar 9, so as to surround completely the corresponding portion of rim 4, passing, for the external axial arms 9a and 11a, inside said portion of rim 4 and, for internal axial arms 9b and 11b, inside set portion of rim 4, in corresponding opening 6 The rigid link between the attachment element 11 and the external radial spar 9 is provided by an external axial screw 12a radially introduced from the exterior through arm 11a of element 11 and screwed in arm 9a of spar 9, as well as by two internal axial screws 12b radially introduced from outside through arm 11b of attachment element 11 and screwed each in one of the two arms 9b of spar 9. The threaded borings, provided in arms 9a and 9b of said spar 9, for receiving the screws 11a and 11b which interlock attachment element 11 on rim 4 are visible in FIG. 11.

The root of each blade is shaped as a portion of forked attachment 13 having two arms 13a and 13b which are axially separated, internal arm 13b passing through corresponding opening 6 of the hub body 3, whereas the external arm 13a extends externally of rim 4 and corresponding laminated spherical stop 7. The internal radial extremities of the two arms 13a and 13b are respectively set in setting recesses 10a and 10b provided respectively in the external axial side and internal axial side of internal radial spar 10 of the laminated spherical stop 7 corresponding thereto. These extremities of the two arms 13a and 13b are secured against said internal spar 10 by a bolt 14 which axially passes, from the exterior to the interior, through a single cylindrical tubular pin 15 located in aligned borings pierced in the internal spar 10 and in these internal radial extremities of arms 13a and 13b, the head of bolt 14 resting against external arm 13a, and a nut 16 being screwed and retained on the threaded extremity of the stem of bolt 14 which protrudes towards the interior of the internal arm 13b, whereas the boring axially pierced in internal spar 10 is provided, at the two axial extremities thereof, with anti-friction shouldered rings 17, one of which is partially visible in FIG. 11, in the bottom of the external axial recess 10a, where emerges the boring of spar 10 traversed by pin 15 and bolt 14.

The internal spar 10, connecting the forked root 13 of the blade to the spherical stop 7 constitutes also therefore a spacer maintaining the two arms 13a and 13b at a distance one from the other with a constant separation.

In this structure, the axes of pin 15 and of connecting bolt 14, in rest position of the blade, is substantially parallel to axis A and intersects substantially perpendicularly the axis of pitch change X—X of the corresponding blade, on which is located the center of swivelling of laminated spherical stop 7 corresponding thereto.

In order to limit the angular motions of flapping of the blades on each side of the rotation plane of the tail rotor, substantially defined by the pitch change axes X—X on FIG. 2, as well as the angular movements of the blade in drag in the rotation plane thereof, the rotor head includes, for each blade, a device of flapping and drag stops including a stationary stop 20, solid with hub 3, and a movable stop, mounted on the forked attachment element 13 of the corresponding blade.

Each stationary stop 20 includes a stop element proper 22, having the shape of a finger generally frustro-conical, mounted so that it converges radially towards the exterior, and in radial projection towards the exterior relatively to the spar 9 corresponding thereto, on a central and radial support 23, centered on pitch axis X—X of the corresponding blade. This support 23 has a threaded external radial extremity and is solid, by its internal radial extremity with a coaxial cylindrical bearing surface 24 of greater diameter carried by the corresponding attachment element 11, radially externally of its stirrup portion 11a-11b.

Figure 9:
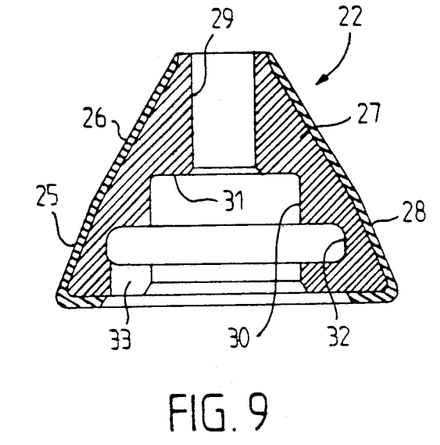
FIG. 9 is an enlarged view, in diametral cross-section along IX—IX of FIG. 10, of a frustro-conical stop element of the stationary stop of the device of flapping and drag stops equipping the rotor head of FIGS. 1 and 2.
Figure 10:
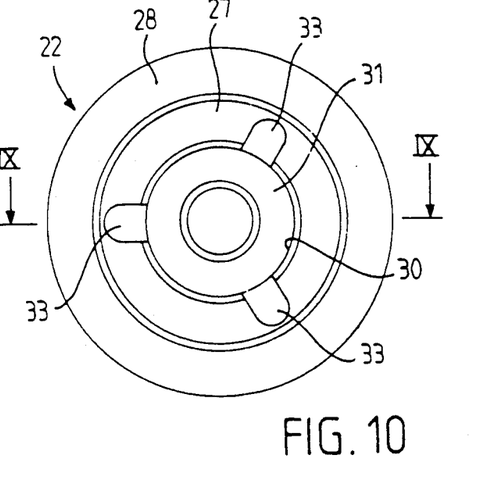
FIG. 10 is a view of the large base of the frustro-conical stop element of FIG. 9.

The stop finger 22, represented at a larger scale in FIGS. 9 and 10, is of a general frustro-conical shape and has a lateral or peripheral surface which is a surface of revolution around its longitudinal axis. This lateral surface of revolution, which constitutes a continuous support zone around the periphery of finger 22 is defined by two frustro-conical tiers, one of which, e.g. tier 25, adjacent from the great base, corresponds to an apex angle slightly smaller than the one corresponding to the frustro-conical tier 26 which is adjacent the small base. Finger 22 is constituted by a rigid core 27, for example in an aluminum alloy, the lateral surface thereof being covered by a coating or housing 28 in an elastomer protecting it against the hammering by the movable stop and which adheres to core 27 and also covers the edge of the great base of finger 22. The half of finger 22 located in the proximity of the small base is pierced by a coaxial bore 29, having a diameter corresponding to the diameter of support 23, and emerging in a coaxial counter - bore 30, having a greater diameter, pierced in the half of the finger 22 located on the side of its great base, so that the two bores 29 and 30 are connected by an internal radial shoulder 31. Further a release groove 32 is machined radially towards the exterior in the lateral side of bore 30, and three notches 33, peripherally equidistant around the longitudinal axis of finger 22, are machined axially in its great base and emerge in groove 32.

Finger 22 may therefore be fit radially, from the exterior towards the interior, around the support 23, until its internal shoulder 31 rests against the shoulder connecting support 23 to the cylindrical bearing surface 24, so that this surface is also surrounded by finger 22 which is blocked in this position by screwing a nut 34 on the threaded external radial extremity of support 23, as shown on FIGS. 1 and 2. In this position, the longitudinal axis of finger 22 and of support axis 23 is practically identical with the pitch change X—X of the corresponding blade. The position of finger 22 around support 23 may be selected by means of a rotation indexing device ,which is very simple, and which allows to block in any of several possible working positions said finger 22 on support 23. This indexing device comprises a transversal pin 35 retained by the cylindrical bearing surface 24, perpendicularly to it axis, and having an extremity which is protruding on the cylindrical lateral surface of bearing surface 24, so as to be engaged in one of the notches 33 of the great base of tapered finger 22. This engaging of the extremity of pin 35 in a notch 33 of finger 22 is shown in FIG. 2 and allows to block said finger 22 in each of the three working positions so defined around the pitch change axis X—X of the corresponding blade.

Figure 4:
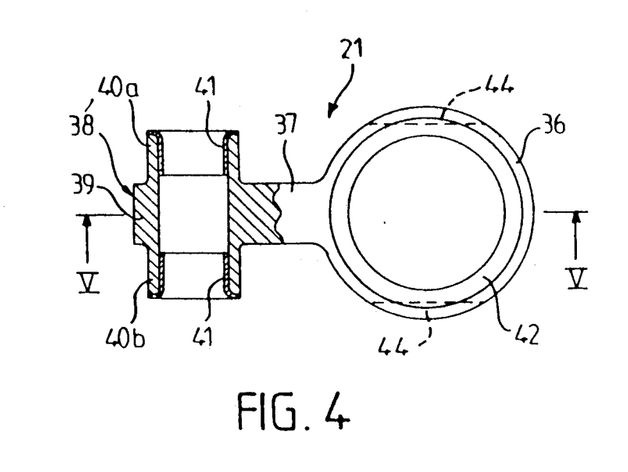
FIG. 4 is a view, at a larger scale and partly in cross-section, of the movable stop of the device of flapping and drag stops equipping the rotor head of FIGS. 1 and 2 for each of the four blades thereof.
Figure 5:
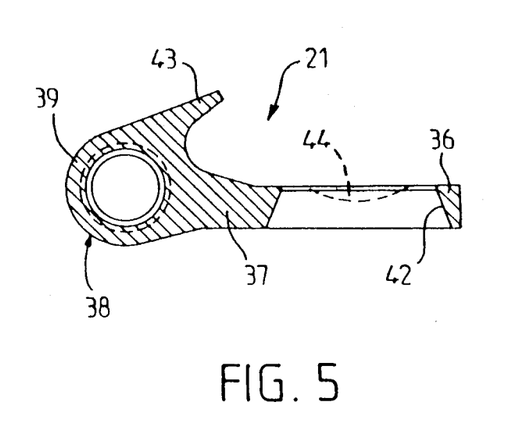
FIG. 5 is a cross-section along V—V of FIG. 4.
Figure 6:
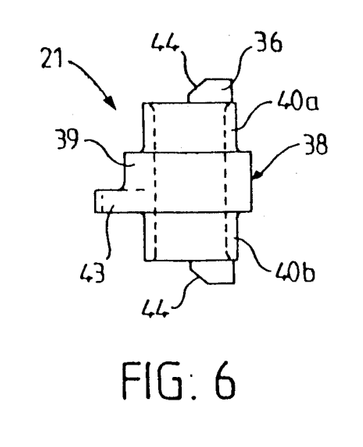
FIG. 6 is a lateral elevation view of the movable stop of FIG. 4.

The movable stop 21 is a stop which is mounted pivotable between the arms 13a and 13b of the forked attachment portion 13 corresponding thereto and the structure of said stop 21 is shown at a larger scale in FIGS. 4 through 6. Said movable stop 21 comprises a stop receptacle, having the shape of a circular ring 36 supported by one extremity of an arm 37 in lateral protrusion relatively to a sleeve 38, at the central portion 39 of which is solidarized arm 37 by its other extremity. Ring 36 and arm 37 are solid with sleeve 38, the central portion 39 of which has an extra thickness radially towards the exterior relatively to its two extremity cylindrical portions 40a and 40b, provided each with an internal anti-friction, ring 41 which is shouldered lining the axial extremities of cylindrical internal bore of sleeve 38. The internal surface of ring 36 is a frustro-conical surface 42 having an axis perpendicular to the axis of sleeve 38, the central portion 39 of which also carries a pin or stud 43 laterally protruding backwards of ring 36, on the side of the front surface of this ring 36 wherein opens the small base of frustro-conical or tapered surface 42. The portions of ring 36 which are diametrally opposed in a direction which is parallel to the axis of sleeve 38 have bevelled edges 44 provided on the front surface towards the pin 43.

Figure 7:
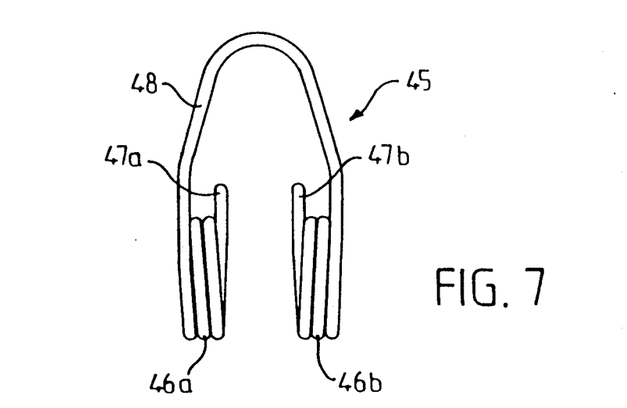
FIG. 7 shows a torsion spring, mounted on the movable stop of FIGS. 4 through 6, in the way represented in FIG. 3.
Figure 8:
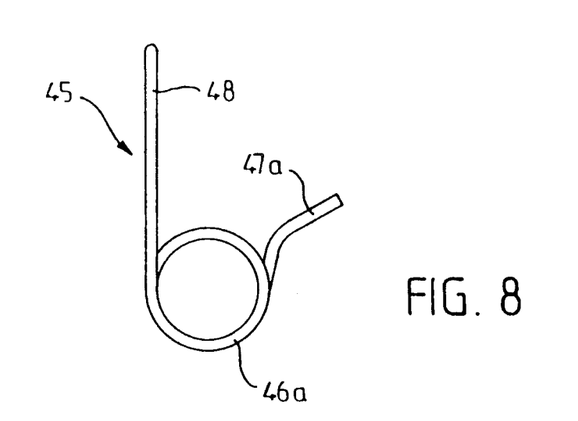
FIG. 8 is a an end view of the spring of FIG. 7.

This stop 21 cooperates with a return spring which is a torsion spring 45 shown in FIGS. 7 and 8. This torsion spring 45 has two helicoidal portions 46a and 46b, which are coaxial, axially set off one relatively to the other and wound with opposite threads, the internal extremity of each winding 46a or 46b, i.e. the extremity located on the side of the other winding, being bent back as a straight rest or support tongue 47a or 47b, whereas the external or opposed extremities of winding 46a and 46b are connected one to the other forming a rest or support arch 48. Spring 45 is mounted on movable stop 21 so that the windings 46a and 46b surround respectively the extremity portions 40a and 40b of sleeve 39 and that the tongues 47a and 47b of their internal extremities rest behind arm 37, on the side of its frontal surface which is directed towards pin 43, whereas arch 48 arrives behind said pin 43. The unit of movable stop 21 and spring 45 is mounted, as shown in FIGS. 1 and 3, swiveling around a pivot axis 49, passing through sleeve 38 of movable stop 21 and retained between the two arms 50a and 50b of a yoke or fork of a metallic part 50 bolted between arms 13a and 13b of the forked attachment element 13 corresponding thereto. The metallic support element 50 of movable stop 21 and of its swivelling or pivoting articulation is secured between the arms 13a and 13b by three bolts 51 having their axis parallel to axis A of the rotor, and schematically shown in FIG. 1, and the two arms 50a and 50b of the yoke of said element 50 are substantially parallel one to the other and to the rotation plane of the rotor; they are symmetrically disposed on each side of this rotation plane, between arms 13a and 13b, overhanging relatively to these arms 13a and 13b, in an inclined direction towards the front of the leading edge of the corresponding blade and towards the spherical laminated stop 7 of the just preceding blade, in the direction of rotation of the rotor. The axis of pivot 49 is constituted by a stud, maintained by its head against arm 50a of the support yoke, and the stem of which has a threaded extremity protruding on the other side of opposed arm 50b, and on which is screwed and retained a nut 52.

The dimensions of the yoke arms 50a and 50b are such that the pivot axis 49 is laterally offset relatively to the pitch change axis X—X of the corresponding blade, at the level of the cylindrical bearing surface 24 supporting the tapered finger 22. The mounting of movable stop 21 and of spring 45 around the pivot axis 49 is such that the side of ring 36 presenting the greatest opening of the frustro-conical surface 42 is directed towards the tapered finger 22 and that the return torsion spring 45 rests, on the one hand, by its arch 48, against a stationary stem 53, disposed between the arms 50a and 50 of the yoke, and, on the other side, by its support tongues 47a and 47b, against arm 37 of movable stop 21, so as to return this stop, in radial swivelling towards the inside, in position of engagement of its ring 36 around the tapered finger 22 of stationary stop 20.

In order to avoid any jamming of ring 36 on finger 22, the angle at the apex of frustro-conical internal surface 42 of ring 36 is substantially smaller than the one of the first frustro-conical tier 25, that ring 36 surrounds in its position of maximum engagement on FIG. 22, and further pin 43 ensures a limitation of the angular oscillation of ring 36 radially towards the interior under the thrust of return spring 45, by contacting a small plane surface of stationary stop 54 provided on a rib 55 on yoke arm 50b and protruding towards the other yoke arm 50a of support element 50. In position of stop of pin 43 against rib 55, there remains a small clearance between the internal surface 42 of ring 36 and frustro-conical surface 25 directly opposite on tapered finger 22.

In this position, shown in FIGS. 1 and 2 and called "ground" position, that the movable stop 21 occupies when the rotor is at stop or rotates at a rotation speed lower than a predetermined set value, which is itself lower than the minimum speed of rotation necessary for flight, one notes that the oscillations of the blade in flapping, upwards as downwards, and in drag, forwards as backwards, are blocked substantially in the plane of ring 36 by the contact of its internal frustro-conical surface 42 against the peripheral surface of the tapered finger 22. However, the angular oscillations of the blade around its axis of pitch change X—X remain free, which allows the control of the pitch, even when ring 36 covers the tapered finger 22, because the longitudinal axis of the finger, in operating position, is substantially identical with the pitch change axis of the involved blade.

The elastic or resilient characteristics of the return spring 45 and the mass of the movable stop 21, which is in steel, and in particular the mass of its ring 36 and its arm 37, are selected so that, when the rotation speed of the rotors becomes higher than the predetermined set value and progressively increases, ring 36 and arm 37 constitute a fly-weight or inertia block which is submitted to the effects of the centrifugal force and which is progressively retracted by pivoting and radially towards the exterior, against the return spring 45, so that the clearance between the support or rest zone at the periphery of the tapered finger 22 and the frustro-conical support or rest surface 42 inside ring 36 progressively increases, in the same time as the rotation speed of the rotor, thereby authorizing angular oscillations in flapping and drag, of increasing amplitude. In this position called "flight" position, the fixed and movable stops, respectively 20 and 21, limit the flapping angle of the blade by constituting a straight ward or sharp stop. On the contrary in the "ground" position, as defined hereinabove, the stationary stop 20 and the movable stop 21 constitute an absolute stop in flapping and drag.

This device of stops, one of which is retractable in flight under the effect of the centrifugal force and against a return spring, provides two functions:

in the "ground" position, the unit of the blade and its forked attachment element is substantially immobilized, by limitation of its oscillations in flapping and drag at small values or even null value, thereby protecting the laminated spherical stop corresponding thereto against the effects of wind on the blades at stop or at a low rotation speed of the rotor, and authorizes the free oscillation of the blades in pitch, so as to allow the checking before flight of the good operation condition of the pitch control device, along the whole usable range;

in "flight" position, the straightward stop which is realized and limits the flapping angle of the blades is necessary for ensuring that, even during exceptional maneuvers, the corresponding blade cannot hit the structure of the helicopter.

It should also be noted that in the "ground" position, it is not necessary for maintaining in position the blades to place tools, as bonnets fitted on the ends of the blades, and connected by slings to the structure of the helicopter, in order to allows the standing of the helicopter in wind.

It is thus noted that, according to the rotation speed, the movable stop 21, which simultaneously forms, by its own mass, a fly-weight submitted to the effects of the centrifugal force for acting its tipping or teetering around the pivot axis 49, reaches contact, by its ring 36, on different portions of the tapered finger 22 of the stationary stop. Further, for displacing the contact and hammering zone on said tapered finger 22, during lifetime, it may successively be turned and blocked in the various positions defined by the above mentioned indexing device.

Due to the disposition of the stationary and movable stops, respectively 20 and 21, at the exterior of integrated hub-mast 1, the internal volume of this hub-mast under the spherical laminated stops 7 is freed, so that other elements may be located therein, in particular the device for controlling the general pitch of the blades of the tail rotor. This device comprises a collective sleeve 56, which is axially slidable inside the hub-mast 1 and the enlarged axial extremity 56 thereof, directed towards the opening 6, includes, for each blade, a radial yoke or fork 58 in which is articulated the internal axial extremity a rod 59, for controlling the pitch, the external axial extremity of said rod being also articulated in a radial yoke or fork 60 presented by the extremity of a lever 61 for controlling the pitch which protrude laterally on the internal radial spar 10 of the laminated spherical stop 7 corresponding thereto. As shown in FIG. 11, yoke 60 and pitch lever 61 constitute a single element with the internal radial spar 10, realized e.g. in aluminum, for limiting the weight. The two extremities of each pitch control rod 59 are shaped as swivel tips retained each in one of two yokes 58 and 60, each having two parallel arms in substantially radial planes, the radial yoke 60 and the pitch lever 61 protruding relatively to spar 10 on the side of the trailing edge of the corresponding blade.

This internal disposition of the pitch control device and of the pitch lever on the internal radial spar allows to ensure a correct collective pitch control of the blades, demanding reduced forces or efforts for the control, and the location, inside the integrated tubular hub-mast, of the spherical laminated stops 7 provides a small excentration in flapping and drag.

The sleeve 56, which is located inside the hub-mast 1, may also contain a rotating collector providing the electrical feed for a deicing device inserted in each blade of the tail rotor, thereby ensuring a good protection of the collector as well as of the sleeve, the presence of which does not generate any extra aerodynamic drag and which can be easily withdrawn for any maintenance operation.

Although this is not shown in FIGS. 1 and 2, the articulated rotor may also include, for each blade, a drag damper or resilient return counter-plug with incorporated damping, of the visco-elastic or hydro-elastic type, for damping, the angular movements of the corresponding blade in drag and to return it on its neutral drag axis, this device being external to the hub-must 1 and articulated by one extremity thereof on the blade root and by the other extremity thereof either on hub 3 or on the root of the adjacent blade, thereby forming a tie rod between blades.

In the preceding example which has been described in detail, the receptacle of the movable stop 21, which is radially pivoted or swivelled towards to the interior by return spring 45, and so engaged around finger 22 of the stationary stop until it comes practically in contact with the support zone defined by the lateral surface of said finger 22, and which is radially pivoted towards the exterior under the influence of the centrifugal force, and thereby progressively disengaged from finger 22 so that the support surface of the receptacle arrives in contact on different portions of the support zone on finger 22, depending on the rotation speed of the rotor, is a ring 36 the internal lateral surface 42 of which forms a support surface and is opened on its two front sides, corresponding to its radial extremities relatively to the rotor axis A.

But the receptacle of movable stop 21 may have other shapes, provided that it still constitutes also a fly-weight submitted to the action of the centrifugal force for driving the swivelling or pivoting thereof towards the exterior.

Figure 12:
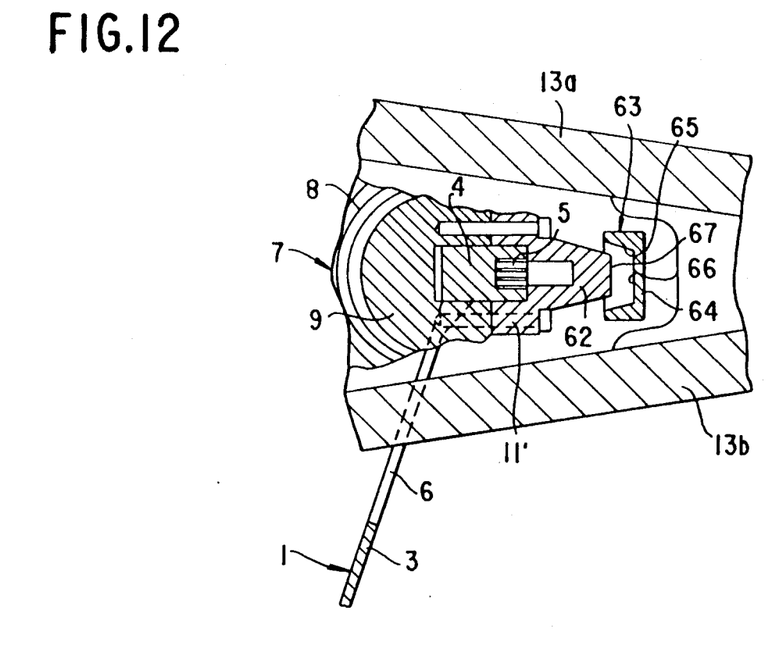
FIG. 12 represents partially, similarly to FIG. 2 a modification of the embodiment of the device of flapping and drag stops equipping the rotor head of FIGS. 1 and 2.

For example, this receptacle may have the shape of a fork, or also, as shown schematically in FIG. 12, of a cupular element 63 or of a ring closed by a bottom 64 on the side opposed to frustro-conical finger of stationary stop 62 which, in this example, is formed as a single element with part 11' for securing the external radial spar 9, of the laminated spherical stop 7 corresponding thereto, on ring 4 of the hub-mast 1. In this case, the rest or support surface, defined by the frustro-conical internal lateral surface 65 of the annular portion of receptacle 63, is completed by the internal surface 66 of the closed bottom 64, and the engaging of receptacle 63 around finger 62 is limited by the arrival of this supplementary support surface 66 against the corresponding support zone 67 constituted by the surface of the small base of finger 62, at its external radial extremity.

Figure 13:
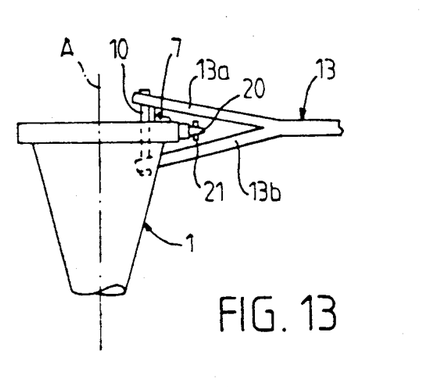
FIG. 13 schematically represents the rotor head of FIGS. 1 and 2.

The use of mixed stop devices, in flapping and drag, according to the invention, is not limited to a tail rotor with integrated tubular hub-mast 1, to which each blade, with a root 13 shaped as a forked fastening or attachment element 13a-13b, is connected by a laminated spherical stop 7, the internal spar 10 of which is solid with the internal radial extremities of the forked element 13, and so that stationary stop 21 of the device is radially protruding towards the exterior, relatively to the external radial spar of this laminated stop 7, as schematically shown in FIG. 13, and corresponds to the example of embodiment of FIGS. 1 and 2. But it is also possible to use such devices of mixed stops on tail or principal rotors, the rotor heads of which are schematically shown on FIGS. 14 through 17.

Figure 14:
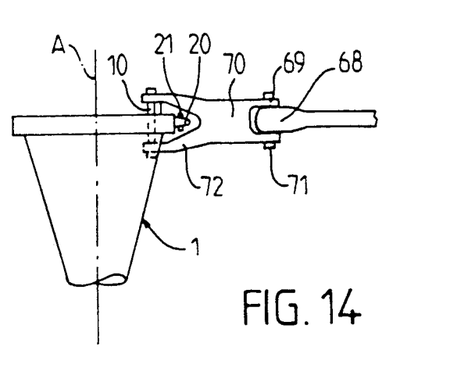
FIG. 14 represents an another hinged or articulated rotor head having the same integrated tubular hubmast as the one in FIG. 13, with a radial sleeve linking each blade to said hub-mast.

On FIG. 14, each blade is maintained by its root 68 in an external radial extremity yoke 69 of a radial sleeve 70 connecting the blade to the tubular hub-mast 1, the maintenance of the blade root 68 in yoke 69 being realized for example by two axes 71 parallel to axis A of the rotor and in the same plane, transversal to the pitch axis of the corresponding blade, and one of which is removable for allowing to bend back the blade around the other. Sleeve 70 also has an internal radial yoke 72 one arm of which penetrates in hub-mast by a radial opening of this hub-mast, and the two arms of which have their internal radial extremities secured to the internal spar 10 of a spherical laminated stop resting, as in the preceding example, by its external spar against the interior of the rim of hub-mast 1, the stationary stop 20 of the mixed stop device being, as preceedingly, solid with the hub-mast and the external spar, and protruding radially towards the exterior, whereas the movable stop 21 of the mixed stop device is mounted pivotally between the arms of yoke 72.

Figure 15:
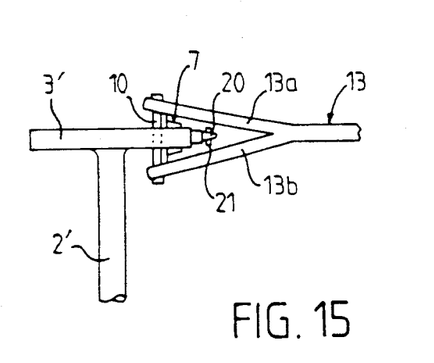
FIG. 15 schematically represents an other hinged or articulated rotor head, the hub of which includes a single radial plate with recesses, associated to blades the root of which is extended by a forked fastening element.

The rotor head shown in FIG. 15 differs essentially from the head of FIG. 13 only by the structure of the hub, which essentially comprises in the embodiment of FIG. 15 a single radial plate 3' solid in rotation with the superior extremity of a rotor-mast 2'. Plate 3' has, for each blade with a root 13 which is forked (13a, 13b) a cavity axially recessed and wherein is located the laminated spherical stop 7 corresponding thereto. As previously, the internal spar 10 of this stop, traversing the cavity, is secured to the internal extremities of arms 13a and 13b of blade root 13, whereas external spar of laminated stop 7 rests against the external radial edge of the cavity and is secured to the corresponding portion of the plate, e.g. by means of a fastening element carrying, protruding radially towards the exterior, the stationary stop 20 of the mixed device of stops according to the invention. As in example of FIG. 13, the movable stop 21 of this device pivots between the arms 13a and 13b of the blade root 13.

Figure 16:
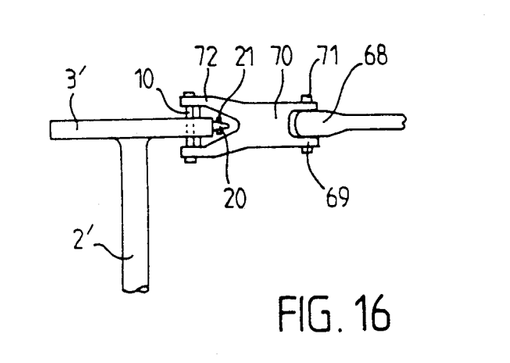
FIG. 16 schematically represents an other modification of the articulated rotor head provided with a hub according to FIG. 15, and to which each blade is connected by a radial sleeve.

The rotor head shown schematically on FIG. 16 differs from the head of FIG. 15 only by the substitution, to the forked fastening element (13a, 13b) integrated to the blade root 13, of a linking radial sleeve 70, as described with reference to FIG. 14, and cooperating in the same manner, on the one hand, with the blade root 68 and, on the other hand, with the internal spar 10 of the corresponding spherical laminated stop, respectively by its external yoke 69 and its internal yoke 72.

Figure 17:
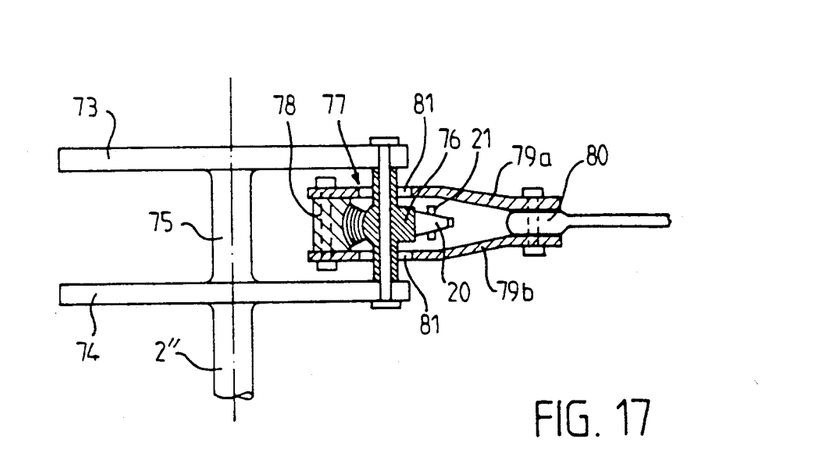
FIG. 17 schematically represents another modification of the articulated rotor head, the hub of which has two radial plates, the rotor heads according to FIGS. 13 through 17 being all equipped with flapping and drag stops according to the invention.

Finally, on FIG. 17, the rotor head comprises two radial plates 73 and 74, superposed and axially spaced one from the other, which are rigidly fixed to a central shaft 75 connecting one plate to the other and are solid in rotation with the upper extremity of a rotor-mast 2''. For each blade, the two radial plates 73 and 74 include portions facing each other and, between the external radial edges of which is secured a spacer constituted by an external radial spar 76 of a laminated spherical stop 77 for articulation of the corresponding blade on the hub. The internal spar 78 of this laminated stop 77 is secured between the internal radial extremities of the two arms 79a and 79b of a double yoke retaining, between its external radial extremities, the root 80 of the corresponding blade, the two arms 79a and 79b of the double yoke further having openings 81 traversed by portions of the external spar 76 allowing its fixation on blades 73 and 74 of the hub. In this embodiment, the stationary stop 20 of the device of mixed stops may be carried directly, in external radial projection, by the external spar 76, the movable stop 21 being mounted pivotally between the two arms 79a and 79b of the double yoke.

It is easy to understand that the device of mixed flapping and drag stops defined hereinabove has the essential advantages that it is simple and light, not easily jammable, without detrimental effect in case of bad functioning, provides the functions thereof in the "ground" and "flight" positions with the same elements, further authorizes the control of the free oscillation of the pitch control before starting the rotation of the rotor, and allows to realize precise and performing flapping and drag stops, for rotors the flapping and drag axes of which are not materialized, as is the case for the rotors the blades of which are articulated on hubs by spherical laminated stops. Further, this device may easily be integrated in the architecture of the hubs of these rotors, because the stationary and movable stops of the device may be located, as said spherical laminated stops, in the forked fastening portion of the blade or of a sleeve linking the blade to the hub.

We claim:

1. An articulated rotor head for a gyroplane, comprising:
   a rotor mast,
   a rotor hub fixedly mounted to said rotor mast,
   a plurality of rotor blades,
   retaining and linking means coupled to said blades and said hub, for coupling said blades to said hub, said retaining and linking means including at least two arm portions forming a forked fastening element, which are connected to one of said blades and said rotor hub;
   flapping and drag stop means coupled to each rotor blade for limiting a flapping angle of the blade, said flapping and drag stop means for each blade including
   a) a first stop element fixedly coupled to said hub, and radially protruding outward in a direction perpendicular to an axis of said hub, and is disposed in a gap formed by upper and lower said arm portions of said retaining and linking means, and has at least one support zone defined by at least one portion of a surface of a revolution around a longitudinal axis of the stop element which is substantially radial and identical to a pitch axis of a corresponding blade,
   (b) a second stop element resiliently mounted on said retaining and linking means, said second stop element being substantially circular and having at least one support surface defined by at least one portion of an inner peripheral surface around the longitudinal axis of the first stop element,
   (c) resilient return means springably pressing said second stop element radially inward toward an axis of rotation of said hub when a rotation speed of the rotor is below a fixed value, wherein when a rotation speed of said rotor is higher than the fixed value, centrifugal force moves said second stop element away from said axis of rotation of said hub;
   said first stop element being of a cone-like shape radially converging toward the radial exterior, and said second stop element is mounted on said retaining and linking means by a pivoting member having an axis substantially parallel to the rotation axis of the hub, and a clearance progressively increases between said first stop element and said second stop element corresponding to the rotation speed of the rotor, with the clearance creating a flapping and drag stop limit for the rotor blade, and when the rotation speed of the rotor is below the fixed value, said first stop element and said second stop element are urged into a cooperation position where the support surface of said second stop element is urged into close proximity with said at least one support zone of said first stop element, thereby limiting angular movement of the rotor blade to close to zero in both a flapping and a dragging direction.

2. An articulated rotor head according to claim 1, wherein said first stop element further comprises a peripheral surface which is a frusto-conical surface forming a continuous support zone, and said second stop element comprises an internal surface having a tapered surface opposed to and substantially in contact with said continuous support zone of said first stop element.

3. An articulated rotor head according to claim 2, wherein said tapered internal surface of said second stop element has an apex angle which is smaller than an apex angle of the radially converging portion of the continuous support zone of said first stop element.

4. An articulated rotor head according to claim 1, wherein said inner peripheral surface of said second stop element is an internal side of an annular portion forming a continuous support surface.

5. An articulated rotor head according to claim 1, wherein said second stop element includes a closed portion on an external radial side relative to the axis of rotation of the rotor wherein said closed portion limits the engagement of the second stop element around the first stop element when said closed portion contacts a radial extremity of said first stop element.

6. An articulated rotor head according to claim 1, wherein said second stop element is a ring having two opened radial extremities relative to the axis of rotation of the rotor, and said first stop element protrudes through said radial extremities.

7. An articulated rotor head according to claim 1, wherein said second stop element has a fixed weight and operates as a fly-weight radially retractable toward the radial exterior, against a force of said resilient return means, when the rotation speed of the rotor exceeds the fixed value.

8. An articulated rotor head according to claim 1, wherein said second stop element pivotally and removably attached to a support yoke which is mounted to said forked fastening element of said retaining and linking means, said second stop being located in said space formed by said upper and lower arms.

9. An articulated rotor head according to claim 1, wherein said second stop element comprises an arm laterally protruding from a sleeve which is rotatably mounted to a support yoke which is fixed to said retaining and linking means.

10. An articulated rotor head according to claim 9, wherein said resilient return means includes at least one torsion spring, said torsion spring having helically bent portions which surround said sleeve, and having one end pressably resting against a first stationary stop means on said support yoke, and another end pressably fitting against said second stop element.

11. An articulated rotor head according to claim 10, wherein said sleeve further comprises:
a central portion supporting a corresponding arm; and
two cylindrical end portions, which are each surrounded by said helically bent portions of said torsion spring;
wherein said torsion spring further includes a support tongue pressing against a portion of said second stop element, and
a bent portion forming an arc which pressably fits against said first stationary stop of said support yoke.

12. An articulated rotor head according to claim 9, wherein said second stop element further comprises a rib which pressably contacts a stationary stop of the support yoke when the rotation speed of the rotor is below the fixed value, to limit the radial movement of said second stop element relative to said first stop element.

13. An articulated rotor head according to claim 12, wherein said stationary stop comprises a stop surface contacted by said rib attached to a support part of said second stop element.

14. An articulated rotor head according to claim 1, wherein said first stop element is mounted on a central support member of said retaining and linking means, said central support member being secured to said hub and said first stop element is radially positioned thereon, wherein said support member is secured to said hub, and said first stop element can be moved to several different working positions.

15. An articulated rotor head according to claim 14, wherein said central support member is secured to a spar of said retaining and linking means of a corresponding blade on said hub, coaxially to said pitch axis of said blade, and wherein indexing means are provided for positioning said first stop element around said pitch axis of said blade into said working positions.

16. An articulated rotor head according to claim 15, wherein said central support member further comprises:
an external radial extremity having a threaded portion therein;
an internal radial extremity having a coaxial cylindrical bearing located therein, radially outwardly projecting from a fastening point where said central support member is fastened to said hub;
wherein said first stop element is fastened to said support member by a nut threaded onto said external radial extremity, and
said indexing means includes a transversal pin located in a surface of the cylindrical bearing, with one end of said transversal pin protruding relatively to said cylindrical bearing surface, and
said first stop element includes at least one aperture provided therethrough, wherein said protruding end of said transversal pin engages one of said apertures, thereby locking the working position of said first stop element.

17. An articulated rotor head according to claim 1, wherein said first stop element further comprises:
a core of a rigid material;
an elastomeric sheath surrounding said core, providing a protective covering.

18. An articulated rotor head for a gyroplane, comprising:
a rotor mast;
a rotor hub fixedly mounted to said rotor mast;
a plurality of rotor blades;
retaining and linking means coupled to said hub, said retaining and linking means including;
(a) an external radial spar secured to said hub,
(b) a forked fastening element coupled to said blades, said forked fastening element having upper and lower arms thereon;
(c) an internal radial spar secured to internal radial extremities of a corresponding forked fastening element, and
(d) a laminated integrated spherical stop disposed between two corresponding spars and located between said upper and lower arms of said corresponding forked fastening element, and
flapping and drag stop means coupled to each rotor blade for limiting a flapping angle of the blade, said flapping and drag stop means for each blade including
(i) a first stop element fixedly coupled to said hub, and radially protruding outward in a direction perpendicular to an axis of said hub, and is disposed in a gap formed by said upper and lower arms of said forked fastening element, and has at least one support zone defined by at least one portion of a surface of a revolution around a longitudinal axis of the stop element which is substantially radial and identical to a pitch axis of a corresponding blade.

(ii) a second stop element resiliently mounted on said retaining and linking means, said second stop element being substantially circular and having at least one support surface defined by at least one portion of an inner peripheral surface around the longitudinal axis of the first stop element.

(iii) resilient return means springably pressing said second stop element radially inward toward an axis of rotation of said hub when a rotation speed of the rotor is below a fixed value, wherein when a rotation speed of said rotor is higher than the fixed value, centrifugal force moves said second stop element away from said axis of rotation of said hub;

said first stop element being of a cone-like shape radially converging toward the radial exterior, and said second stop element is mounted on said retaining and linking means by a pivoting member having an axis substantially parallel to the rotation axis of the hub, and a clearance progressively increases between said first stop element and said second stop element corresponding to the rotation speed of the rotor, with the clearance creating a flapping and drag stop limit for the blade and when the rotation speed of the rotor is below the fixed value, said first stop element and is second stop element are urged into a cooperation position where the support surface of said second stop element is urged into close proximity with said at least one support zone of said first stop element, thereby limiting angular movement of the rotor blade to close to zero in both a flapping and a dragging direction.

19. An articulated rotor head according to claim 18, wherein said internal radial spar for each blade includes housing recesses disposed at opposed axial sides, whereby the internal radial extremities of the arms of the forked fastening element are attached by a single pin having an axis substantially parallel to the rotor axis.

20. An articulated rotor head according to claim 18, wherein each rotor blade includes:

a pitch control lever fixed to the corresponding internal radial spar, protruding laterally thereto and having a radial yoke which is connected to a rod which is part of a pitch control device.

21. An articulated rotor head according to claim 18, wherein said forked fastening element is integrated to an end of the corresponding rotor blade.

22. An articulated rotor head according to claim 18, wherein said forked fastening element for each blade is a radial linking element, comprising:

an internal radial extremity in the shape of a yoke having two arms secured to the internal radial spar of the corresponding retaining and linking means;

an external radial extremity in the shape of a yoke which secures an end of the corresponding rotor blade in an axis parallel to the rotation axis of the rotor;

wherein said internal radial extremity and said external radial extremity allow the blade to pivot.

23. An articulated rotor head according to claim 18, wherein said hub includes:

two radial plates axially spaced from each other, wherein said external radial spar of said retaining and linking means for each blade is mounted therebetween.

24. An articulated rotor head according to claim 18, wherein said hub includes:

a single radial plate having bores therethrough for the attachment of each of said rotor blades, and wherein said retaining and linking means includes a recess, wherein a peripheral portion of said plate is sized to fit into said recess.

25. An articulated rotor head according to claim 24, wherein, for each blade, the external radial spar of the corresponding retaining and linking means is shaped, radially toward the exterior, as a stirrup which rides a corresponding portion of the hub, and carrying said first stop element thereupon.

26. An articulated rotor head according to claim 18, wherein said hub and said rotor mast are integrated as a tubular unit, said unit having a plurality of openings corresponding to the number of blades, wherein a corresponding forked fastening element of said blades is sized to fit therethrough and at least a portion of said retaining and linking means is located therein to secure said forked fastening element to said integrated unit.

27. An articulated rotor head according to claim 26, for a tail rotor of a helicopter, wherein said integrated tubular unit is frusto-conically shaped, and at its small end is formed a rotor mast portion, a pitch control device including a collective sleeve is disposed inside said integrated tubular unit for axial sliding, and a radial yoke for each blade upon which is hinged a corresponding pitch control rod, and wherein said pitch control device is disposed inside of said tubular unit.

28. An articulated rotor head according to claim 26, wherein, for each blade, the external radial spar of the corresponding retaining and linking means is shaped, radially toward the exterior, as a stirrup which rides a corresponding portion of the hub, and carrying said first stop element thereupon.

* * * * *

UNITED STATES PATENT AND TRADEMARK OFFICE
CERTIFICATE OF CORRECTION

PATENT NO. : 5,116,209
DATED      : May 26, 1992
INVENTOR(S) : Marc ANGLADE et al It is certified that error appears in the above-identified patent and that said Letters Patent is hereby corrected as shown below:

On the cover page, Item [73], delete "Societe Nationale Industrielle et Aerospatiale" and insert therefor -- Aerospatiale Societe Nationale Industrielle --.

Signed and Sealed this

Twenty-first Day of September, 1993

Attest:

BRUCE LEHMAN

Attesting Officer

Commissioner of Patents and Trademarks